United States Patent [19]
Irwin et al.

[11] Patent Number: 4,870,992
[45] Date of Patent: Oct. 3, 1989

[54] BACKFLOW PREVENTION DEVICE

[75] Inventors: Lawrence F. Irwin, Los Angeles; Frank Irwin, Oceano, both of Calif.

[73] Assignee: Augerscope, Inc., Sylmar, Calif.

[21] Appl. No.: 138,807

[22] Filed: Dec. 28, 1987

Related U.S. Application Data

[63] Continuation-in-part of Ser. No. 938,417, Dec. 5, 1986, abandoned.

[51] Int. Cl.4 .............................................. F16K 15/14
[52] U.S. Cl. .................................... 137/846; 137/362
[58] Field of Search ................ 137/362, 846, 849, 850

[56] References Cited

U.S. PATENT DOCUMENTS

| | | | |
|---|---|---|---|
| 194,329 | 8/1877 | Buhrer | 137/846 |
| 803,979 | 11/1905 | Bonnell | 137/846 X |
| 2,352,642 | 7/1944 | Langdon | 137/849 |
| 2,371,449 | 3/1945 | Langdon | 137/846 X |
| 3,118,468 | 1/1964 | Bochan | 137/846 |
| 3,707,986 | 1/1973 | Breen | 137/849 |

FOREIGN PATENT DOCUMENTS

| | | | |
|---|---|---|---|
| 362324 | 10/1922 | Fed. Rep. of Germany | 137/846 |
| 1600743 | 10/1981 | United Kingdom | 137/850 |

*Primary Examiner*—Robert G. Nilson
*Attorney, Agent, or Firm*—James E. Brunton

[57] ABSTRACT

A backflow prevention device for use in wastelines and the like having a one piece yieldably deformable valving member which permits free flow of liquids in one direction but blocks the flow of liquids and gasses in the opposite direction. Fluid flow through the device is directly proportional to the fluid pressure exerted on the valving member.

4 Claims, 2 Drawing Sheets

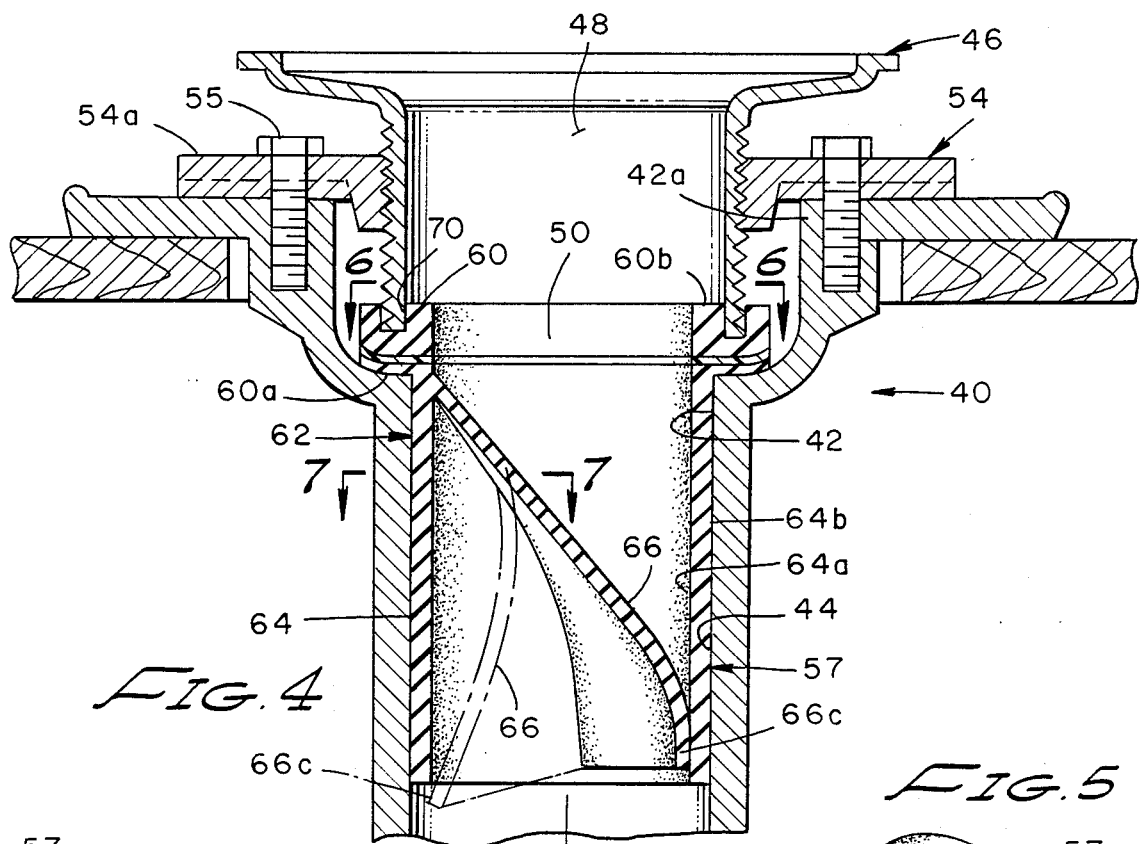
FIG. 4
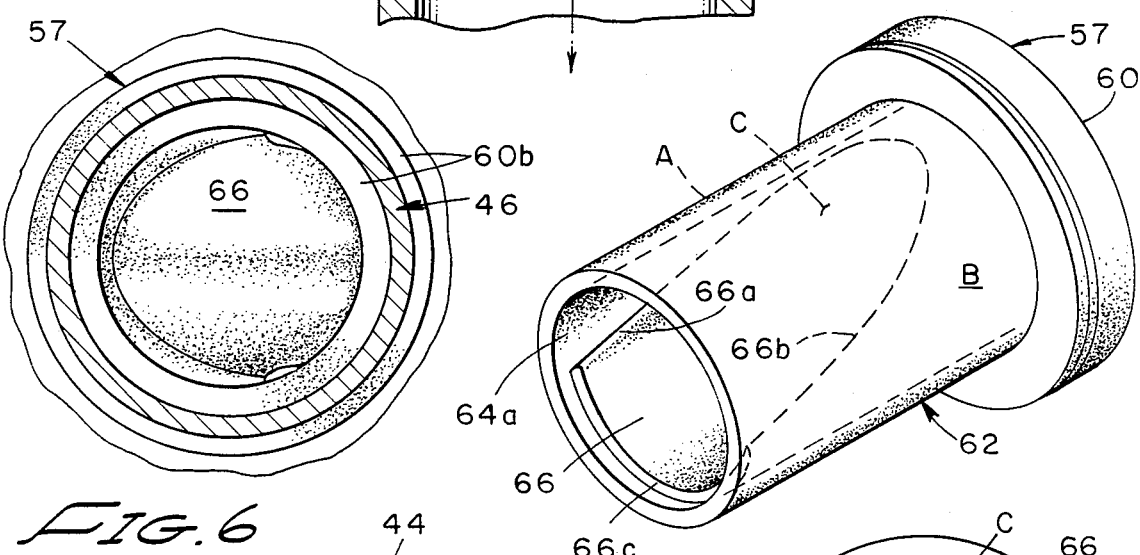
FIG. 5
FIG. 6
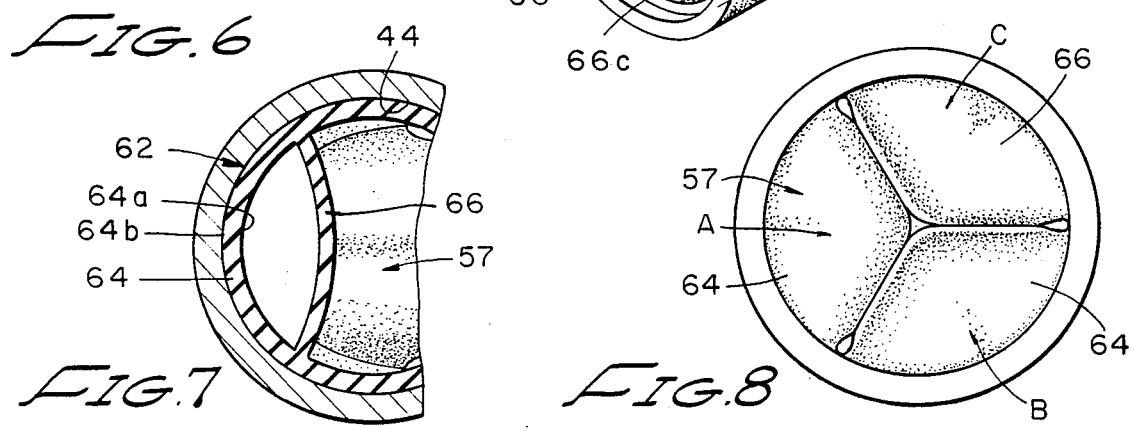
FIG. 7
FIG. 8

BACKFLOW PREVENTION DEVICE

BACKGROUND OF THE INVENTION

This is a continuation-in-part application of co-pending application Ser. No. 06/938,417 filed Dec. 5, 1986, now abandoned.

1. Field of the Invention

The present invention relates generally to valving mechanisms. More particularly, the invention concerns a backflow prevention device for use in wastelines and the like which permits fluids to flow freely into the drain of the wasteline, but positively prevents flow of fluids or gases in the opposite direction.

2. Discussion of the Prior Art

Several types of wasteline backflow prevention devices have been devised in the past to minimize the backflow of sewer gas and other waste fluids. Generally these prior art devices are of two types, the co-called "ball cock" type and the "flapper" valve type. Both types of devices have serious drawbacks. For example, the flapper type valves are somewhat unreliable and prone to freezing in either an open or closed position. Additionally, these devices frequently fail to provide an adequate seal to prevent backflow of sewer gasses. The ball cock type device, on the other hand, provides a better seal, but undesirably relies on spring pressure to bias the ball into a closed position. Improper spring tension, or spring failure, can render this type of device virtually useless.

Typically the prior art flapper devices are used in horizontal drain lines while the ball cock devices are used in vertical drain lines. Therefore, in most installations, two types of valving mechanisms must be used, thereby adding installation expense and design complexities. As will be appreciated from the discussion which follows, since the device of the present invention can be used in either horizontal or vertical runs, this problem is effectively overcome.

Another disadvantage of the prior art devices is that neither the ball cock nor the flapper type devices will accommodate sewer drain cleanout springs and heads. The novel design of the valve of the present invention, on the other hand, permits sewer cleanout springs and heads to readily pass through the device. Additionally, while the prior art devices are frequently complex, expensive and often difficult to install, the device of the present invention is the essence of simplicity and permits quick and easy installation and replacement.

SUMMARY OF THE INVENTION

The backflow prevention device of the present invention is adapted to be installed in the drain opening of fluid conduits, such as wastelines, which have an inlet and a longitudinally extending surface proximate the opening. The device comprises a first member having a fluid inlet, a fluid outlet and an edge portion circumscribing the fluid outlet and means for removably connecting the first member to the wasteline drain. At the heart of the device of the present invention is novel valving means disposed intermediate the edge portion of the first member and the inlet opening of the fluid conduit for permitting free flow of fluids into the inlet opening, or drain, but blocking fluid flow in the opposite direction. In the preferred form of the invention the valving means comprises a valve member having an annular portion and a yieldably deformable wall connected to and extending outwardly from the annular portion. The wall has a first portion normally disposed in close engagement with the longitudinally extending surface of the fluid conduit and a second portion normally disposed in a first position in close engagement with the first portion of the yieldably deformable wall. The second portion of the wall is yieldably deformable in response to fluid pressure to a second position to permit the flow of fluids through the drain in a direction toward the inlet opening of the fluid conduit.

An object of the present invention is to provide a reliable backflow prevention device for use in sewer lines and the like which permits free flow of fluids into sewer line but positively prevents any backflow of gas, water or other fluids in the opposite direction outwardly through the sewer drain.

Another object of the invention is to provide a device of the aforementioned character which permits uninhibited, free flow of water through the device under normal drainage conditions. More particularly, the device of the invention is provide a specially designed valve member wherein fluid flow capacity increases as fluid flow pressure increases.

Still another object of the invention is to provide a sewer stop of the character described in the previous paragraphs which can be used in vertical, horizontal or angularly extending drain lines.

A further object of the invention is to provide a sewer stop device which will readily accommodate sewer drain cleanout springs and heads.

Yet another object of the invention is to provide a device of the class described which embodies a minimum number of parts, is easy to install, remove and maintain and one which can be produced at very low cost.

Yet another object of the invention is to provide a backflow prevention device having a value member of unique design for use in applications where backflow pressures can be subtaintial. More particularly, the valve member collapes upon itself under backflow pressure in a manner to provide a more positive sealing as the backflow pressure increases.

BRIEF DESCRIPTION OF THE DRAWINGS

FIG. 4 is a side elevational view partially in crosssection of an alternate form of backflow prevention device of the present invention.

FIG. 5 is a generally perspective view of the valve member of the device shown in FIG. 4.

FIG. 6 is a view taken along lines 6—6 of FIG. 4.

FIG. 7 is a view taken along lines 7—7 of FIG. 4.

FIG. 8 is a view similar to FIG. 6 but showing the closed, fluid flow blocking position of the valve member wherein the side and tongue portions of the valve member cooperate to block a reverse fluid flow.

DESCRIPTION OF THE INVENTION

Figure 1:
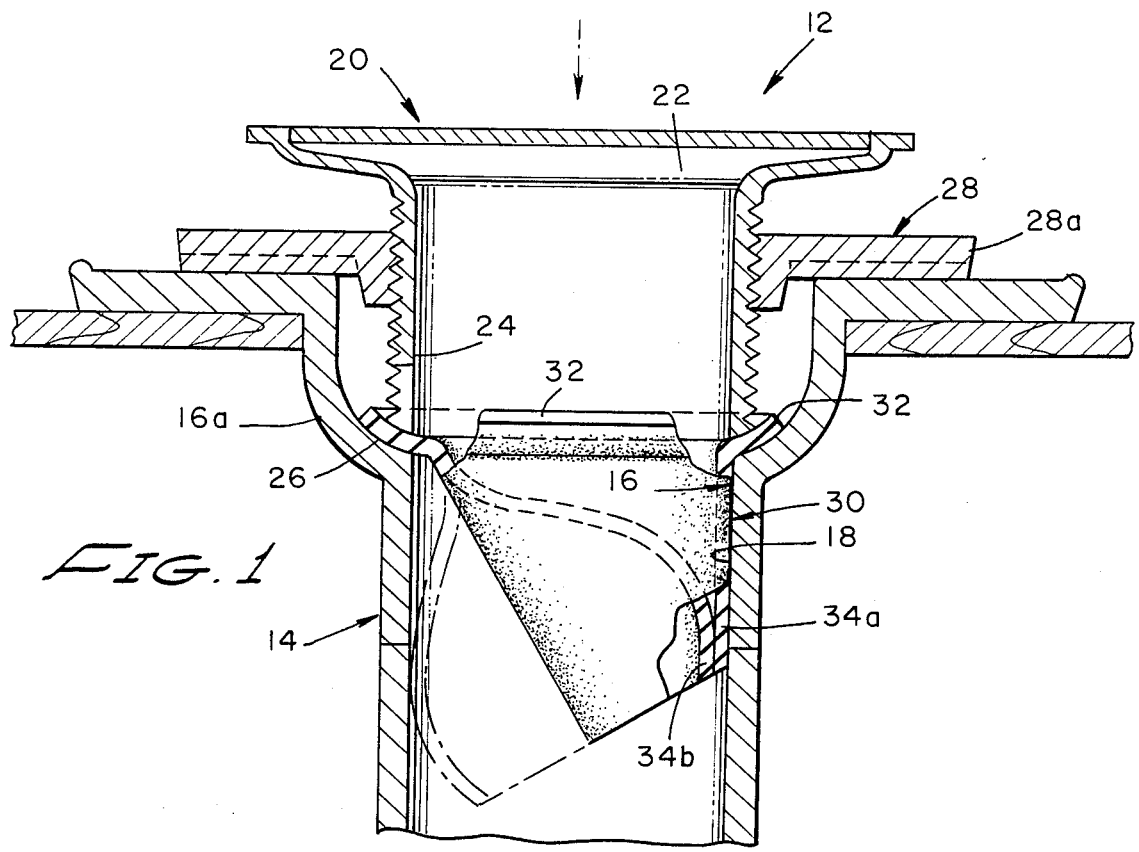
FIG. 1 is a side elevational view partially in crosssection of the backflow prevention device of the present invention.
Figure 2:
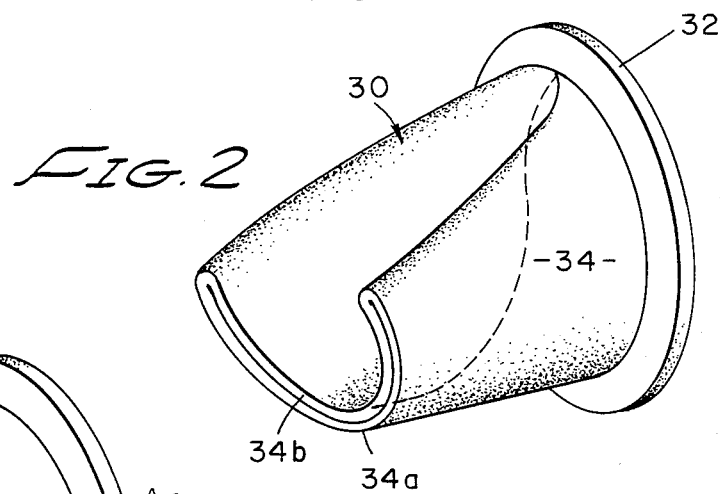
FIG. 2 is a generally perspective view of the valve member of the device shown in FIG. 1.

Referring to the drawings, and particularly to FIGS. 1 and 2, the backflow prevention device of the present invention, generally designated by the numeral 12, is adapted for use in fluid conduits of the character shown in FIG. 1 and designated therein by the numeral 14. Such fluid conduits have an inlet opening 16 and a longitudinally extending surface 18 disposed proximate the opening 16. The fluid conduit 14 shown in FIG. 1 is in the form of a sewer drain having a bell shaped drain opening 16a terminating at one end in inlet opening 16. One important application of the device of the present invention is as a sewer stop which functions to permit waste fluids to flow freely into the drain and then into the waste conduit but prevents the flow of fluids or gasses in the opposite direction.

The device of the present invention comprises a first drain insert member 20 having a fluid inlet 22, a fluid outlet 24 and a lower edge portion, or shoulder, 26 circumscribing the fluid outlet. Connector means are provided for removably connecting first member 20 to the fluid conduit proximate the inlet opening thereof. In the form of the invention shown in the drawings, the connector means comprises an internally threaded annular ring, or second member, 28 which is secured with the fluid conduit, or waste line, in any suitable manner. For example, member 28 may be provided with a flange portion 28a which can be secured to the fluid conduit drain opening by fasteners or other mechanical means.

As indicated in FIG. 1, first member 20 is provided with a downwardly depending cylindrical section which is externally threaded and adapted to threadably mate with the internal threads provided on second member 28. With this construction, the edge portion 26 of member 20 is movable toward and away from the inlet opening of the fluid conduit by threading member 20 into member 28 in either a clockwise or counterclockwise direction.

Forming an important aspect of the apparatus of the present invention is valving means which is disposed intermediate the edge portion 26 of first member 20 and the inlet opening 16 of the fluid conduit. The valving means functions to permit the flow of fluids into the inlet opening but blocks fluid flow in the opposite direction.

Figure 3:
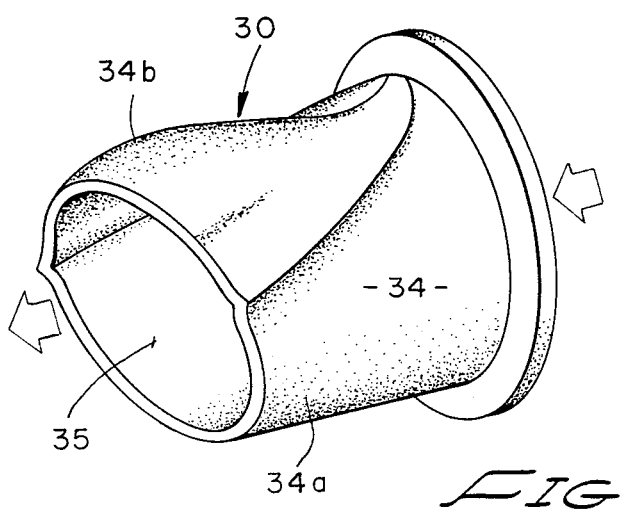
FIG. 3 is a perspective view of the valve member similar to FIG. 2 but showing the member in an open fluid flow configuration.

Referring also to FIGS. 2 and 3, the valving means of the present embodiment of the invention is provided in the form of a valve member generally designated by the numeral 30. Valve member 30 is preferably molded in a single integral piece of a soft rubber composite such as natural rubber, silicon rubber or like materials. The valve member comprises a substantially rigid annular shaped portion 32 and a yieldably deformable wall 34 connected to, and extending outwardly from, annular portion 32. Wall 34 has a first portion 34a (FIG. 1) normally disposed in close engagement with the longitudinally extending surface 18 of the fluid conduit and a second portion 34b normally disposed in a first position in engagement with the first portion 34a of the yieldably deformable wall. As best seen by referring to FIGS. 2 and 3, second portion 34b of the valve member is yieldably deformable in response to fluid pressure from a first position shown in FIG. 2 to a second position shown in FIG. 3. Referring also to FIG. 1, the second position of the valve member is shown in phantom lines. As indicated in FIG. 1 and FIG. 3, in its open position the valve provides a wide open passageway 35 to accommodate the free flow of fluids through the valve and into the conduit, or waste line, 14. Conversely, when the valve member 34 is in the closed position, as shown in FIG. 2 and as indicated by the solid lines in FIG. 1, flow of fluids and gasses in the opposite direction is positively prevented. In fact, the greater the pressure of fluids tending to flow upwardly as viewed in FIG. 1, the more effective the seal against their passage becomes.

Another important feature of the apparatus of the present invention is the fact that the annular portion 32 of the valve member is securely clamped between edge portion 26 of first member 20 and the inlet 16 of the waste line. This clamping action is accomplished by threadably advancing member 20 relative to member 28. As member 20 is threadably advanced, edge 26 is brought into pressural contact with the ring shaped portion 32 of the valve member tending to securely and positively seal it against the lower portion of the bell-shaped drain of the sewer line. In this position, the backflow of fluids is positively sealed off.

It is apparent from FIG. 1 that the valve member 32 can be easily removed from the assembly by simply unscrewing member 20 relative to member 28, removing the valve member through the drain opening and then replacing a new valve member and securing it in position within the sewer drain in the manner shown in FIG. 1.

It is also apparent from a study of the phantom line position of the valve member in FIG. 1 that sewer cleanout springs and heads are readily receivable through the valve member to enable quick cleanout of blockages in the fluid conduit or sewer line 14.

Members 20 and 28 can be constructed of a variety of materials including metals and plastics. When the components are molded of a rigid plastic, the device is particularly inexpensive and can be manufactured in large quantities at a very low cost. Because of the simple design of the apparatus and its ease of installation into a drain line, assembly and disassembly of the unit can be accomplished in a very short time by unskilled workers.

Turning now to FIGS. 4 through 7, an alternate form of backflow prevention device of the present invention, is there shown. This device is adapted for use in applications where substantial backflow pressures are likely. The device is designed to be used in fluid conduits of the character shown in FIG. 4 and is designated therein by the numeral 40. Such fluid conduits have an inlet opening 42 and a longitudinally extending surface 44 disposed proximate the opening 42. The fluid conduit 40 shown in FIG. 4 is of the same character as that shown in FIG. 1 having a bell shaped drain opening 42a terminating at one end in inlet opening 42. An important function of the device is to permit waste fluids to flow freely into the drain and then into the waste conduit, but to prevent the flow of fluids or gasses in the opposite direction.

The device of this alternate form of the invention comprises a first drain insert member 46 having a fluid inlet 48, a fluid outlet 50 and a lower edge portion, or shoulder, 52 circumscribing the fluid outlet. Connector means are provided for removably connecting first member 46 to the fluid conduit proximate the inlet opening thereof. In the form of the invention shown in the drawings, the connector means comprises an internally threaded annular ring, or second member, 54 which is secured to the fluid conduit, or waste line, in any suitable manner. For example, member 54 may be provided with a flange portion 54a which can be secured to the fluid conduit drain opening by fasteners 55 or by other suitable mechanical means.

As indicated in FIG. 4, first member 46 is provided with a downwardly depending cylindricl section which is externally threaded and adapted to threadably mate with the internal threads provided on second member 54. With this construction, the edge portion 52 of member 46 is movable toward and away from the inlet opening of the fluid conduit by threading member 46 relative to member 54 in either a clockwise or counterclockwise direction.

Forming an important aspect of the alternate form of the apparatus of the invention shown in FIGS. 4 through 7 is valving means, the flange portion of which is disposed intermediate the edge portion 52 of first member 46 and the inlet opening 42 of the fluid conduit. The valving means functions to permit the flow of fluids into the inlet opening while effectively blocking fluid flow in the opposite direction. As will presently be described, the design of the valve member is such that it collapses inwardly on itself under conditions of backflow pressure, that is fluid flow in a direction toward the inlet of the fluid conduit. Because of the novel design of the valve member, presently to be described, as the backflow pressure increases, the sealing ability of the valve also increases. Referring particularly to FIGS. 5, 6, and 7, the valving means of the alternate embodiment of the invention is quite different from that previously described herein and is provided in the form of a differently configured valve member generally designated in the drawings by the numeral 57. Valve member 57 is preferably molded in a single, integral piece of soft rubber composite such as natural rubber, silicon rubber or like materials. The valve member comprises a substantially rigid annular shaped flange portion 60, a body portion 62 having yieldably deformable cylindrical, or tabular shaped walls and a tongue portion 66. Walls 64 have inner and outer surfaces 64a and 64b. Outer surface 64b is normally disposed in close engagement with the longitudinally extending surface 44 of the fluid conduit (FIG. 4).

It is important to note that annular shaped flange 60 is provided with an outlet facing surface 60a and an inlet facing surface 60b. Inlet facing surface 60b is provided with a circumferentially extending groove 70. Groove 70 closely receives edge 52 of member 46 so that when member 46 is threaded into ring 54, flange 60 is maintained precisely centered and securely clamped, between member 46 and the lower portion of bell shaped opening 42a.

Turning particularly to FIG. 5, the uniquely shaped tongue member 66 of the valving means is disposed within the tubular body of the valve member in an at rest configuration the manner there shown. Tongue 66 has spaced apart edges 66a and 66b which are affixed to, or integrally formed with, inner surface 64a of the walls of body portion 62. As best seen by also referring to FIG. 4, the lower curved edge 66c of tongue 66 is normally biased radially outwardly toward the inner surface of the tubular body of the valve member. However, fluid flowing through the fluid inlet 48 will cause the lower portion of the tongue to move radially inwardly in a direction away from the inner surface 64a of walls 64 of body 62 as shown by the phantom lines in FIG. 4. The design of the tongue is such that the greater the fluid flow through inlet 48, the greater will be the movement of the tongue away from the inner surfaces of the walls 64 to accommodate the increase in fluid flow.

With the tongue in the normally closed position shown in FIG. 5, any fluid flow in a first direction, that is toward inlet 48, will be blocked in a highly novel manner. Turning to FIGS. 7 and 8, under fluid flow in the first, or backflow direction, tongue portion C will be deformed upwardly toward inlet 48. Simultaneously, side walls A and B of tubular body 64 will move radially inwardly into pressural engagement with tongue portion C. In this condition, backflow of fluids is positively blocked. Further, an increase in backflow pressure will result in the side walls and the tongue moving into increasing pressural engagement thereby providing a progressively improving seal against leakage of fluid flowing toward inlet 48. This cooperative interaction among the side walls of the valve body and the tongue provides a positive seal against fluid backflow which is vastly superior to prior art balloon values of traditional construction. Further, because of the positive clamping of the grooved flange 60 against the inlet of the waste line, the valve member cannot turn inside out as frequently happens with balloon valves of traditional construction.

As is the case with the device of FIG. 1, the valve member 57 of the alternate form of the invention, as shown in FIG. 4, can be easily removed from the assembly by simply unscrewing member 46 relative to member 54, removing the valve member through the drain opening and then replacing a new valve member and securing it in position within the sewer drain in the manner shown in FIG. 4.

It is also apparent from a study of the phantom line position of the valve member in FIG. 4 that sewer cleanout springs and heads are readily receivable through the valve member to enable quick cleanout of blockages in the fluid conduit or sewer line 40.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

We claim:
1. A backflow prevention device for use in fluid conduits having an inlet opening and a longitudinally extending surface proximate thereto comprising:
   (a) a first member having a fluid inlet, a fluid outlet and an edge portion circumscribing said fluid outlet;
   (b) connector means for removably connecting said first member to the fluid conduit proximate the inlet opening thereof; and
   (c) valving means disposed intermediate said edge portion of said first member and said inlet opening of said fluid conduit for permitting free flow of fluids into said inlet opening but blocking fluid flow in the opposite direction, said valving means comprising a valve member including:
      (i) an annular portion;
      (ii) a body portion having a yieldable deformable, generally cylindrically shaped wall connected to and extending generally perpendicular away from said annular portion, said walls having an inner surface and an outer surface, said outer surface being normally disposed in close engagement with said longitudinally extending surface of said fluid conduit; and
      (iii) a yieldably deformable tongue portion having spaced apart edge portions interconnected with said inner surface of said walls of said body, said tongue portion having inner and outer surfaces, a portion of said outer surface being normally disposed in close engagement with said inner surface of said walls to prevent fluid flow in a first member, said portion of said outer surface of said tongue being yieldably deformable in response to fluid pressure to a position spaced apart from said inner surface of said walls to permit fluid flow in a second direction away from said fluid inlet of said first member.

2. A backflow prevention device as defined in claim 1 in which said tongue portion is so constructed and arranged that a fluid pressure exerted in said first direction causes said walls of said body portion to be deformed radially inwardly into pressural engagement with said tongue portion to a position wherein said walls cooperate with said tongue portion to positively block fluid flow in said first direction.

3. A backflow prevention device as defined in claim 2 in which an increase in fluid pressure in said first direction will cause an increase in the pressural engagement of said walls of said body portion with said tongue portion.

4. A backflow prevention device as defined in claim 3 in which said annular portion includes an inlet facing surface and an outlet facing surface, said inlet facing surface being provided with a circumferential groove for closely receiving said edge portion of said first member.

* * * * *